United States Patent
Franz et al.

(10) Patent No.: US 8,554,170 B2
(45) Date of Patent: *Oct. 8, 2013

(54) AUTOMATED ALERT GENERATION IN RESPONSE TO A PREDETERMINED COMMUNICATION ON A TELECOMMUNICATION DEVICE

(75) Inventors: Peter Joseph Franz, Rapid City, SD (US); Karyn Elizabeth Franz, Rapid City, SD (US); Tracy Eugene Mailloux, Rapid City, SD (US); Ross David Hoyer, Rapid City, SD (US); Lucas John Haan, Rapid City, SD (US)

(73) Assignee: Quid Fit LLC, Rapid City, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/296,129

(22) Filed: Nov. 14, 2011

(65) Prior Publication Data

US 2012/0122420 A1 May 17, 2012

Related U.S. Application Data

(60) Provisional application No. 61/456,937, filed on Nov. 15, 2010.

(51) Int. Cl.
*H04M 11/04* (2006.01)

(52) U.S. Cl.
USPC ............ 455/404.1; 455/456.1; 455/550.1; 455/564; 455/460; 379/41

(58) Field of Classification Search
USPC ........... 455/404.1, 404.2, 456.1, 550.1, 564, 455/460; 379/41
See application file for complete search history.

(56) References Cited

U.S. PATENT DOCUMENTS

| | | | |
|---|---|---|---|
| 6,212,260 B1 * | 4/2001 | Baum et al. | 379/38 |
| 6,574,484 B1 | 6/2003 | Carley | |
| 6,775,356 B2 | 8/2004 | Salvucci et al. | |
| 7,221,928 B2 | 5/2007 | Laird et al. | |
| 7,719,414 B1 | 5/2010 | Smith et al. | |
| 8,027,658 B2 | 9/2011 | Suryanarayana et al. | |
| 2004/0072583 A1 | 4/2004 | Weng | |
| 2005/0085257 A1 * | 4/2005 | Laird et al. | 455/550.1 |
| 2007/0142026 A1 | 6/2007 | Kuz et al. | |
| 2008/0166992 A1 | 7/2008 | Ricordi et al. | |
| 2008/0304630 A1 | 12/2008 | Nguyen et al. | |
| 2010/0190468 A1 * | 7/2010 | Scott et al. | 455/404.2 |
| 2010/0190479 A1 | 7/2010 | Scott et al. | |
| 2011/0028118 A1 | 2/2011 | Thomas | |

OTHER PUBLICATIONS

PCT—International Search Report, Feb. 1, 2012, Quid Fit LLC.

* cited by examiner

*Primary Examiner* — Vladimir Magloire
(74) *Attorney, Agent, or Firm* — Gordon & Rees LLP

(57) ABSTRACT

A cell phone software application that automatically informs a person's ICE contacts when their cell phone has made an emergency 911 call. Also included are systems for sending the GPS location of the cell phone to both the emergency service responders and to the ICE contacts. Personal medical information can also be transmitted automatically to the emergency service when the emergency call has been made. A system for disabling the alerting of the person's ICE contacts is also included such that the cell phone user is free to make emergency calls on behalf of other people.

25 Claims, 11 Drawing Sheets

FIG. 7

AUTOMATED ALERT GENERATION IN RESPONSE TO A PREDETERMINED COMMUNICATION ON A TELECOMMUNICATION DEVICE

RELATED APPLICATION

The present invention claims priority to U.S. Provisional Patent 61/456,937, entitled "Automatic Alert Generation In Response To A Predesignated Communication Based On A Telecommunication Device", filed Nov. 15, 2010, the full disclosure of which is incorporated herein for all purposes.

TECHNICAL FIELD

The present invention relates in particular to systems for cell phones to contact emergency services and to other predetermined personnel. In addition, the present invention relates more generally to emergency notification systems.

BACKGROUND OF THE INVENTION

Many people use landlines to call emergency numbers such as 911. However, cell phones are also used to call these emergency numbers. Unfortunately, calling 911 over a cell phone has its disadvantages. Specifically, when a person uses their cell phone to make a 911 call, the first thing the emergency operator does is to ask for the location of the person making the call. (This is because the calling party's phone location is quickly identifiable when using a land line). Therefore, a need exists for the emergency services to quickly and automatically pinpoint the location of the cell phone. Although systems do exist in the United States to automatically detect cell phone location, such systems are not distributed worldwide. Thus, the need to automatically transmit cell phone location to an emergency responder is lacking in many second and third world countries.

Often times, the person making the 911 call is only able to give a very quick summary to the operator when the situation is urgent. The operator then quickly requests as much information (e.g.: medical information) as can be communicated in a short time period. To have this information automatically sent to the operator would be desirable at a minimum, and in some cases it could be life saving.

Lastly, once the person has made the 911 call, there is no mechanism to inform family members as to their location and condition. It would instead be desirable to provide a system that automatically alerts a person's contacts (e.g.: family members) when a person has made an emergency call. It would instead be desirable to provide a system that automatically alerts a person's pre-selected contacts such as family members (and those physicians or medical providers who provide care and have the medical history of the caller). The present invention accomplishes these functions and provides other advantages over existing systems as will be explained herein.

SUMMARY OF THE INVENTION

The present invention provides a system for automatically alerting a person's emergency "ICE" contacts(s) when the person has made an emergency call, comprising: a mobile communication device; an emergency contact software module installed on the mobile communication device for a person to pre-identify at least one emergency contact and input emergency contact information; an emergency call sensing software module installed on the mobile communication device for sensing when the mobile communications device has called an emergency number; and an emergency alert software module installed on the mobile communication device for alerting the at least one emergency contact that the mobile communications device has called the emergency number.

The present system operates by automatically sending a text message from the cell phone to the a plurality of different emergency "ICE" contacts. The advantage of this system is that when a 911 call has been made on the device, it will immediately notify any preselected family members, friends, or medical personnel simultaneously.

Additionally, the GPS system in the mobile communication device ("device") will automatically send the phone's physical location at the time of the call to all preselected "In Case of Emergency" (hereafter "ICE") contacts, which includes the local dispatch contact for the police or sheriffs department, the fire department, as well as family members and medical providers. This system is particularly advantageous in countries where this technology is not yet available to the emergency service dispatch operator. It also allows family members to be able to travel to the scene of the emergency quickly. Optionally, the system will provide continuous GPS updates of the location of the calling person, in the event that they are being transported away from the scene to a hospital.

The present invention also includes an alert cancellation system in which the user is given a pre-determined period of time in which to cancel the alert message notification sent to their ICE contacts. This system is especially beneficial when the person is using the cell phone to make a 911 call on behalf of others. As a result, the calling party who is not involved but who observes an emergency situation can make the 911 call on behalf of others without causing panic for the calling party's own ICE contacts.

Optionally, the present system also displays information including the ICE contacts and any necessary medical information on the cell phone screen after the 911 call has been completed. This is particularly advantageous for both emergency services and passers-by arriving at the scene of the emergency. Specifically, as soon as the cell phone is discovered (near the person who made the 911 call), relevant medical conditions and ICE contact identities can be seen.

The present invention also includes a method of automatically alerting a person's emergency contact when the person makes an emergency call, comprising: inputting emergency contact information into an emergency contact software module installed on a mobile communication device; calling an emergency number from the mobile communication device, thereby activating an emergency call sensing software module installed on the mobile communication device; having the emergency call sensing software module activate an emergency alert software module installed on the mobile communication device, wherein the emergency alert software module retrieves the emergency contact information and then sends a message to the emergency contact that the mobile communications device has called the emergency number. Thus, the device owner adds all their ICE contacts into the emergency contact software module installed on the calling party's device before an emergency situation arises. When an emergency call is made, this activates the emergency call sensing software module installed on the device. The emergency call sensing module activates a separate emergency alert software module installed on the device which identifies all of the preselected ICE contacts and sends them a message indicating that the device owner has called the emergency number.

BRIEF DESCRIPTION OF THE DRAWINGS

FIG. 7 is another illustration of medical and personal information entered into the cell phone.

DETAILED DESCRIPTION OF THE DRAWINGS

Figure 1:
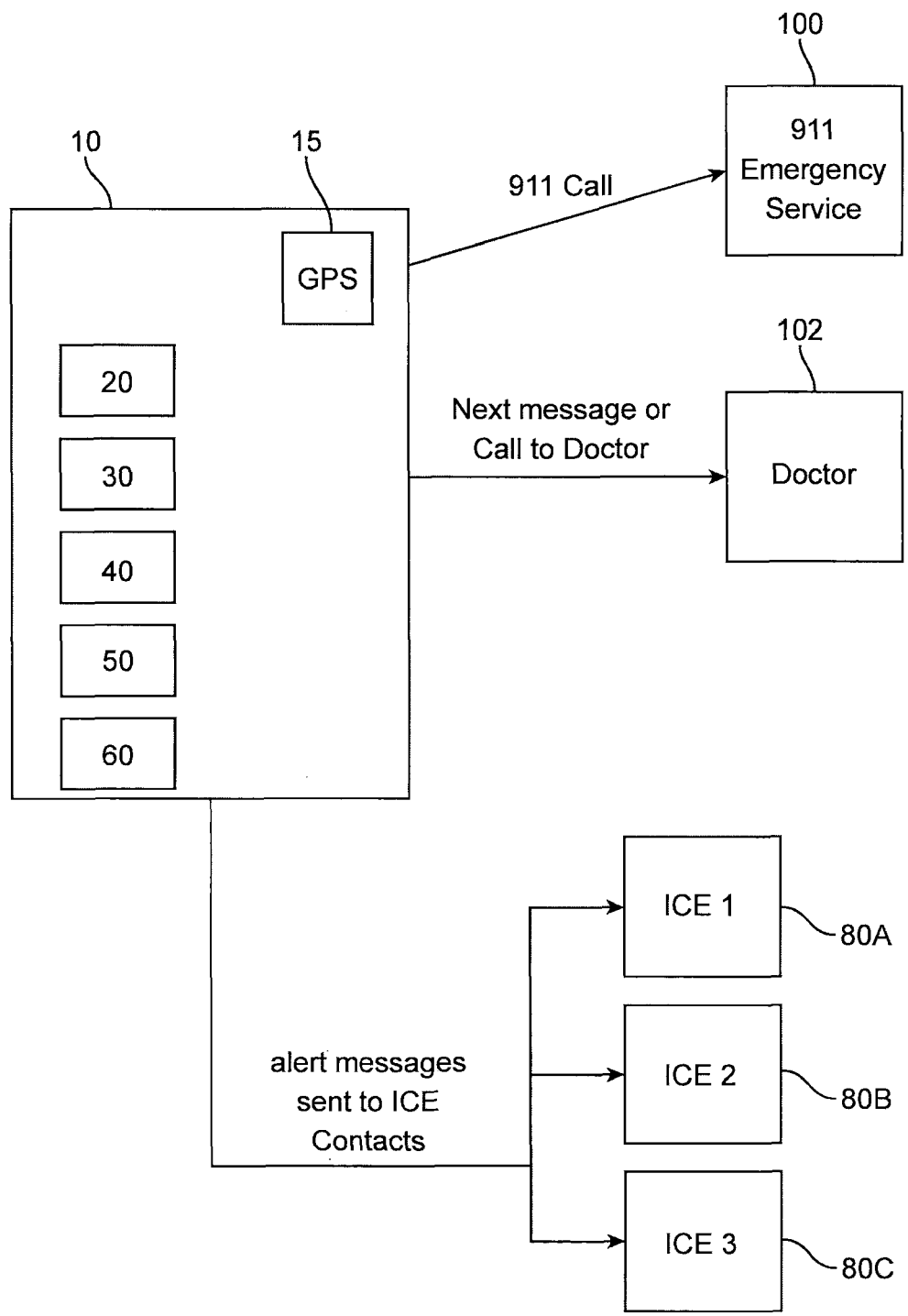
FIG. 1 is a schematic illustration of the components of the present invention in operation.

FIG. 1 illustrates the components of the present invention, being a system for automatically alerting a person's emergency contact when the person has made an emergency call, as follows.

A mobile communication device 10 is provided. Device 10 is typically a cell phone or smart phone, but can be any device capable of making a telephone call, or VOIP (voice over internet protocol), or any other communication made to an emergency service (including, but not limited to, local police, fire, etc.). Simply put, device 10 may be any device capable of calling or contacting 911 or any other emergency number. Broadly speaking, the present invention can be used on any communication device that is aware of its own location. This may include, without limitation, tablets, laptops, desktop computers, etc. As such, the present invention has applications well beyond conventional cell phones and smart phones.

Communication device 10 has a variety of different software modules pre-installed thereon. (It is to be understood that communication device 10 may be a cell phone, a smart phone, or any other communication device that is aware of its own location. Therefore, any reference herein to a "cell phone" is thus understood to include all of these other communication technologies). Specifically, these include at least: (a) an emergency contact software module 20 for the user to pre-identify at least one of their emergency contacts and input emergency contact information; (b) an emergency (or non-emergency) call number sensing software module 30 for sensing when the mobile communications device has called an emergency number; and (c) an emergency alert software module 40 for simultaneously alerting the at least one emergency contact that the mobile communications device has called the emergency number on the device. These three software modules work together as follows.

Figure 2:
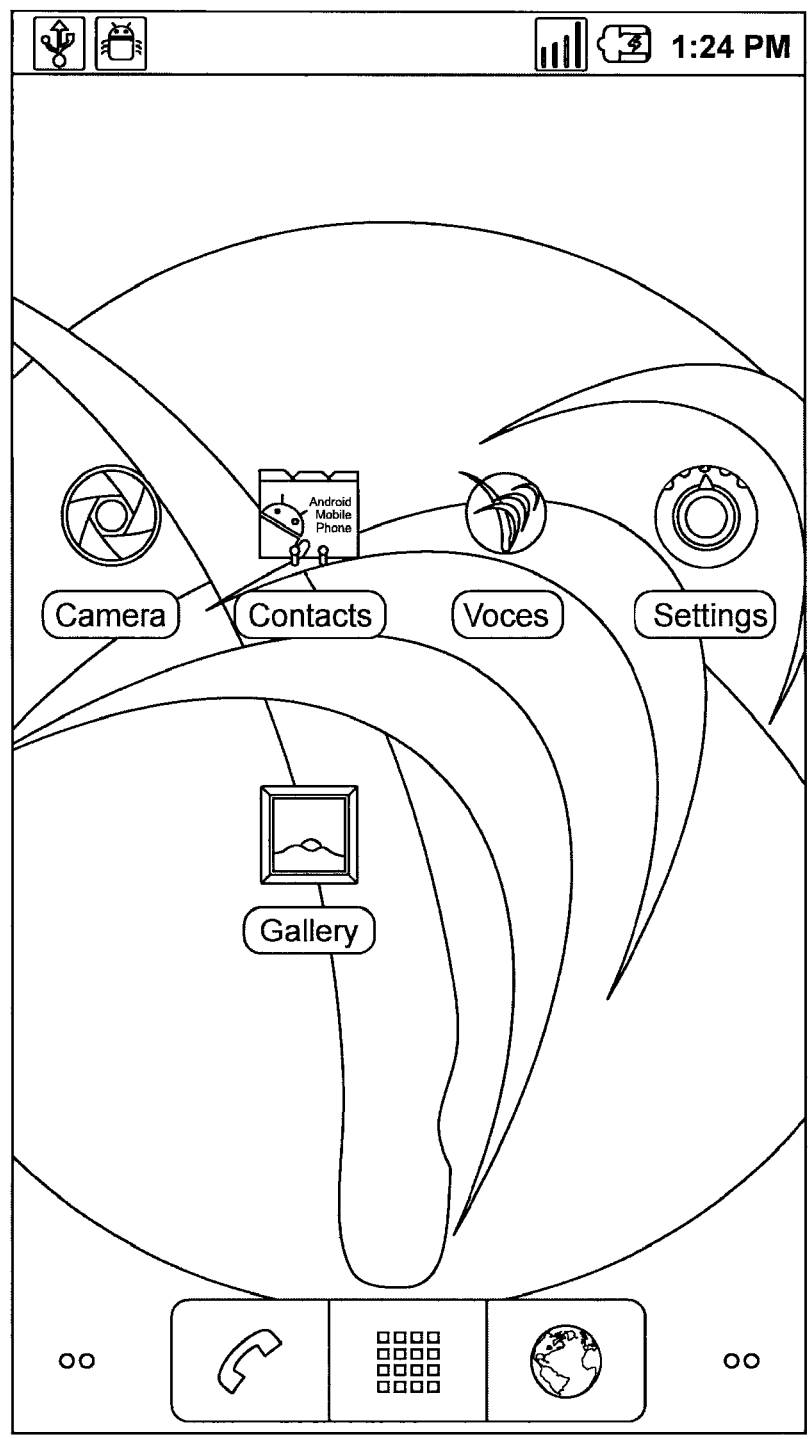
FIG. 2 is an illustration of the desktop screen of a cell phone incorporating the present invention when not in use.
Figure 3:
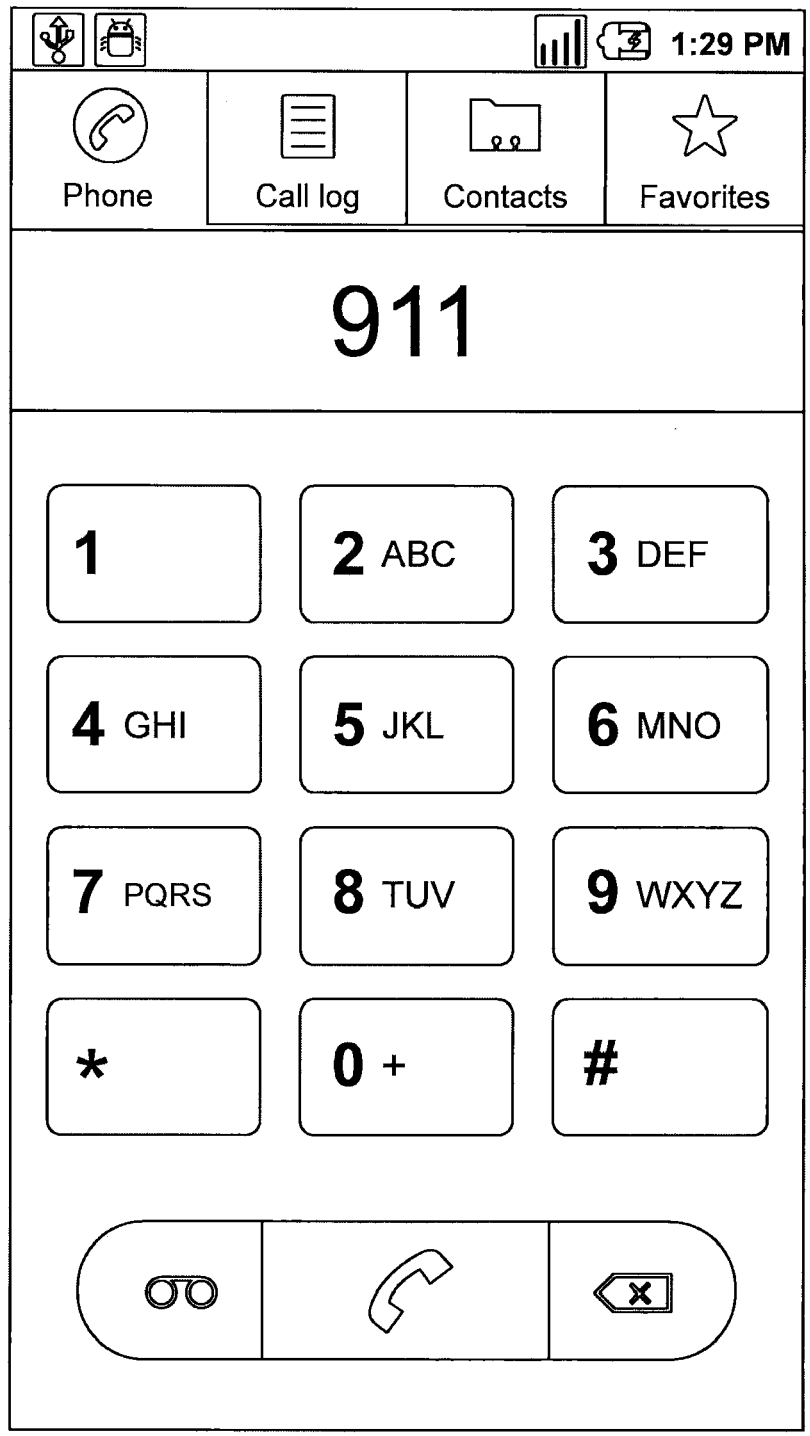
FIG. 3 is an illustration cell phone display when used as a telephone.

FIG. 2 shows the display of the phone prior to use. FIG. 3 shows the display of the phone prior to making a phone call.

Figure 4:
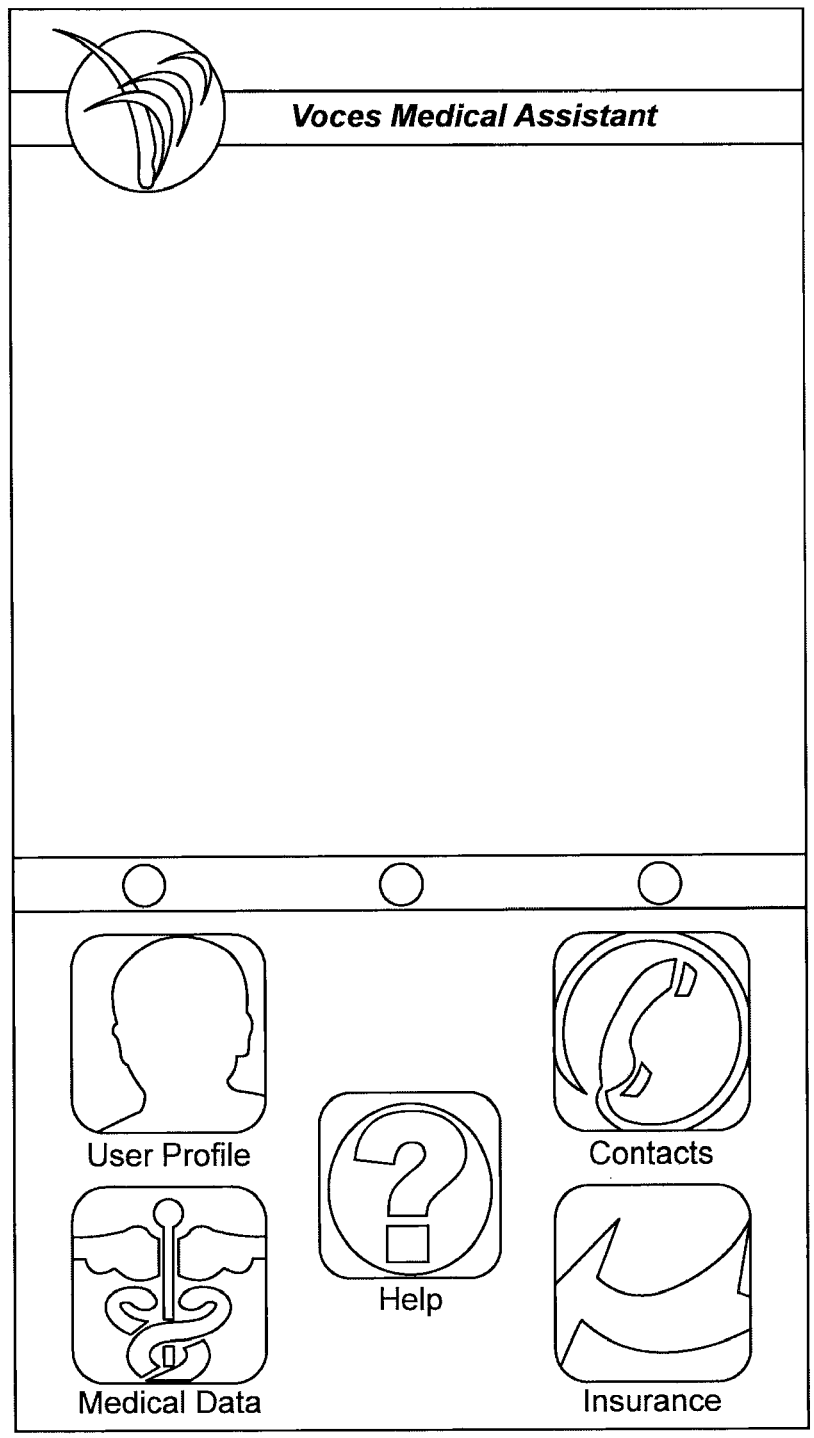
FIG. 4 is an illustration of the cell phone display when initially activating the present invention.

FIG. 4 shows an exemplary display screen when a user first activates the present invention, and prepares to configure it for use. At this time, the user is prompted to enter data corresponding to their "User Profile", "Contacts"; "Medical Data", and "Insurance". It is to be understood that the "Medical Data", and "Insurance" fields are optional and the present invention encompasses embodiments where the user does not enter medical or insurance information.

Figure 5:
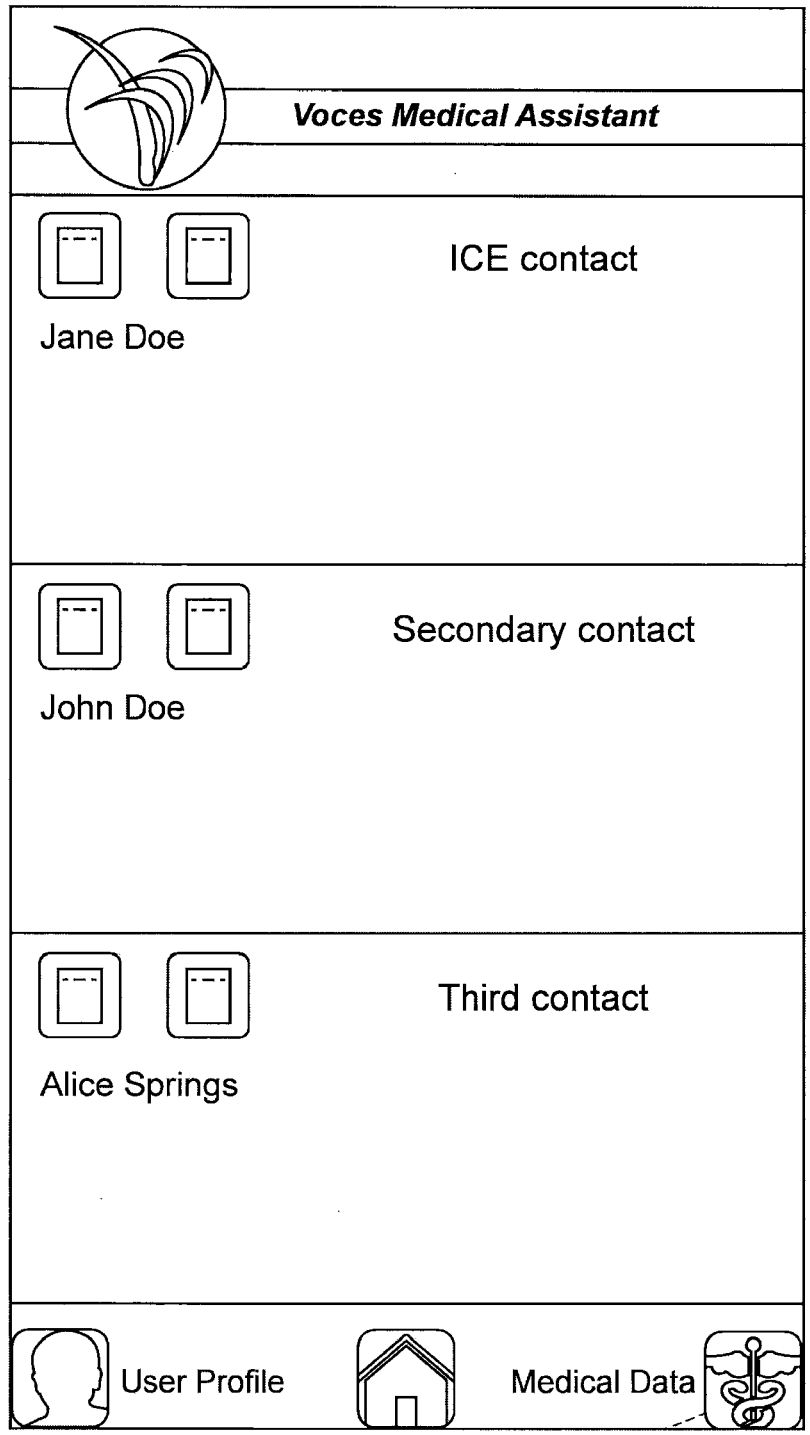
FIG. 5 is an illustration of emergency contacts entered into the cell phone.

Next, as seen in FIG. 5, (after selecting "Contacts" in FIG. 4), the user is prompted to pre-enter the contact numbers for each of the people that want the phone to automatically notify should the user make a 911 or other emergency number call. These "ICE" ("in case of emergency") contacts 80A, 80B, 80C, etc., would most typically be family members, such as an elderly parent wishing to notify their children, or a child wishing to notify their parents. In this particular example, 80A is "Jane Doe", 80B is "John Doe", and 80C is "Alice Springs". It is to be understood, however, that other contact numbers and identities may be programmed in as well. For example, a person may want their doctor 102 (FIG. 1) to be notified should they call 911. In that case, the doctor's contact information would be entered as well. Moreover, the cell phone user may choose to enter only one emergency contact (such as their spouse), or a number of different contacts (family members, friends, doctor, etc).

Figure 6:
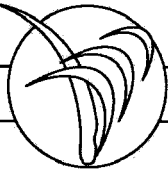
FIG. 6 is an illustration of medical information entered into the cell phone.
Figure 7:
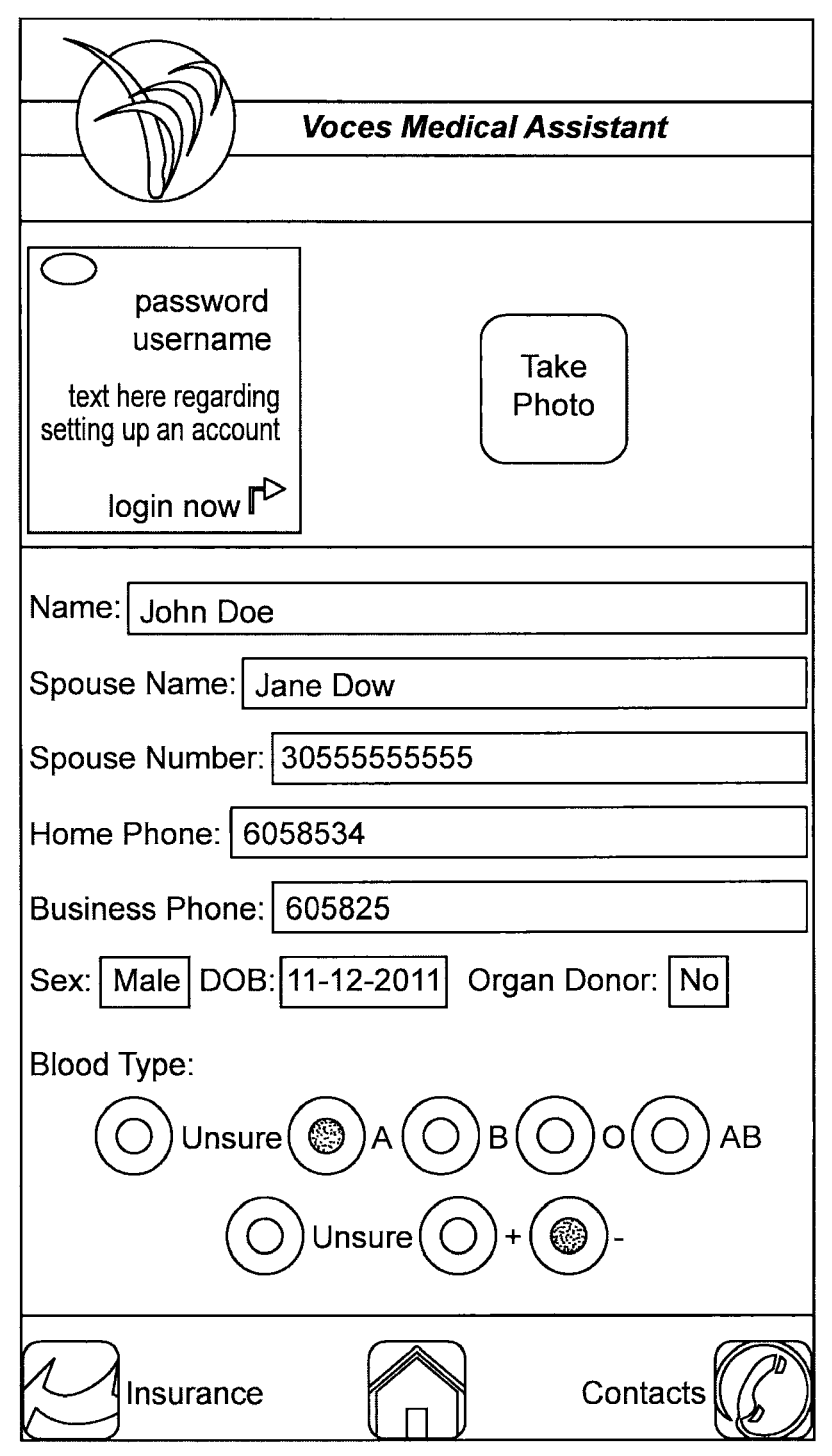

As seen in FIGS. 6 and 7, after the user has selected "Medical Data" in FIG. 4, the user is prompted to optionally enter personal information such as medical information (current medications, allergies, medical conditions, contacts, insurance, medications, physicians, etc.). In this example, the user has entered "Tylenol" as their current medication, "Wheat milk" as their allergy and "Bob" as their family doctor. In FIG. 7, the user may optionally enter their blood type and whether ort not they are an organ donor. All of this information is then stored in the software installed on the phone.

Figure 8:
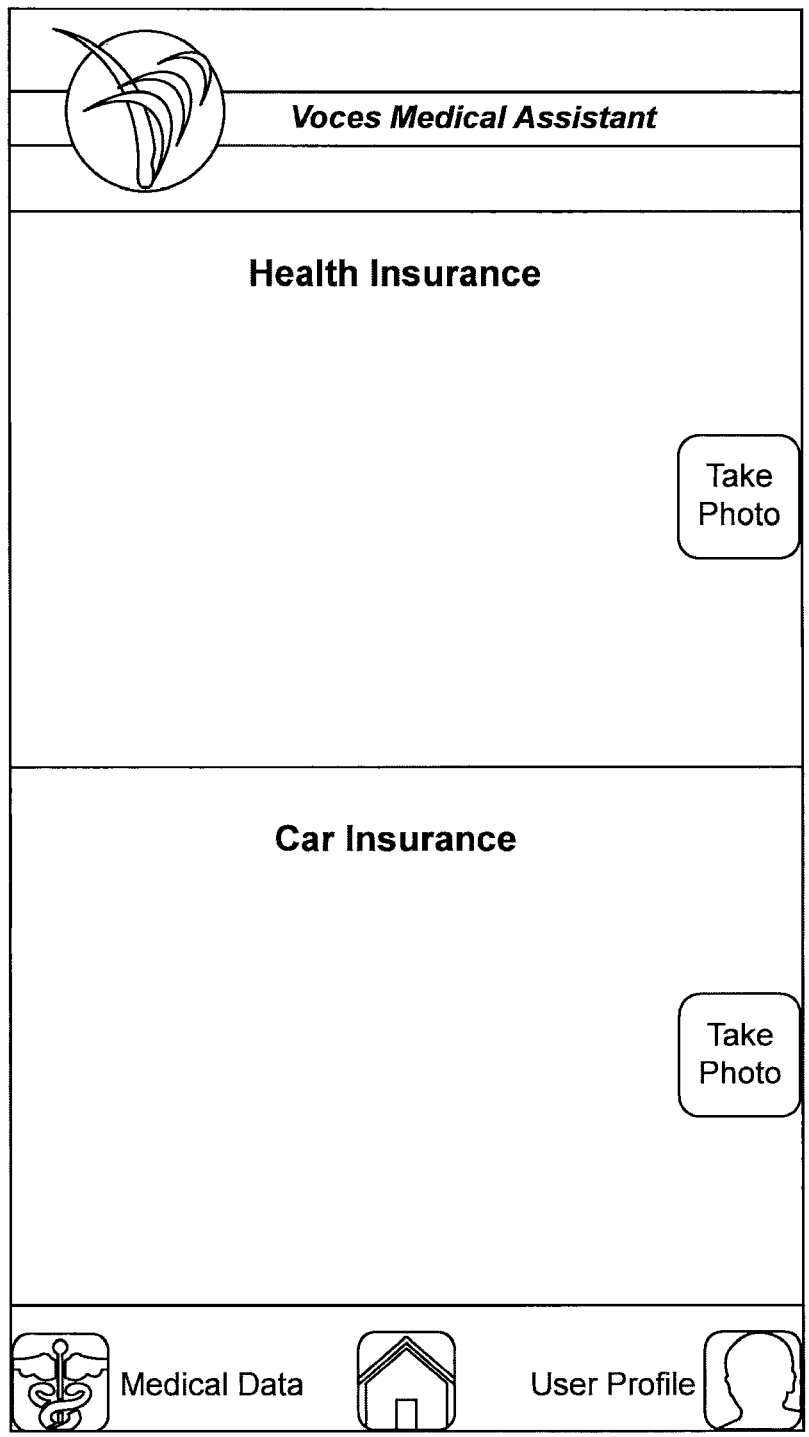
FIG. 8 is an illustration of insurance information entered into the cell phone.

As seen in FIG. 8, after the user has selected "Insurance" in FIG. 4, the user is prompted to optionally also enter insurance information including both health insurance and car insurance information.

Next, an emergency happens and the person uses their phone 10 to make an emergency call. Such a call may simply be dialing 911, but other numbers and options are also possible within the scope of the present invention. (This is because calling 911 simply links a person to a 911 operator who then talks to the person and then assigns the response to the call to a local emergency service such as a local police force or fire department). Therefore, it is to be understood that the present invention is not limited to calling 911 as the sole emergency number. For example, directly dialing the phone number of a local police station would also be an emergency call. In optional embodiments of the invention, the emergency number may itself be pre-programmed into the phone. For example, the person's own doctor's number may be the emergency number. In such a case, the person using the present system may want to alert their family whenever they call their doctor 102. Similarly, the emergency number may be the phone number of the person's caregiver or hospice service.

When the person calls the emergency number (e.g.: 911), emergency call number sensing software module 30 then determines that an emergency call has been made. Preferably, this process starts when the caller has completed their call to the emergency service and has hung up. However, the present invention also encompasses embodiments in which the process starts while the phone call to the emergency service is still in progress. Once emergency call number sensing software module 30 has detected that an emergency call has been made, then emergency alert software module 40 is activated. Furthermore, it is to be understood that the present invention also encompasses embodiments in which a call is first made to a non-emergency service. Thus, call number sensing software module 30 can be used to sense both calls to emergency services (e.g.: 911), and non-emergency calls to pre-programmed in phone numbers. Then, emergency alert software module 40 prepares to send a message to each of the pre-programmed in emergency contacts 80A, 80B, 80C, (and optionally 102) that the user had stored in emergency contact software module 20 (back in FIG. 5).

Figure 9:
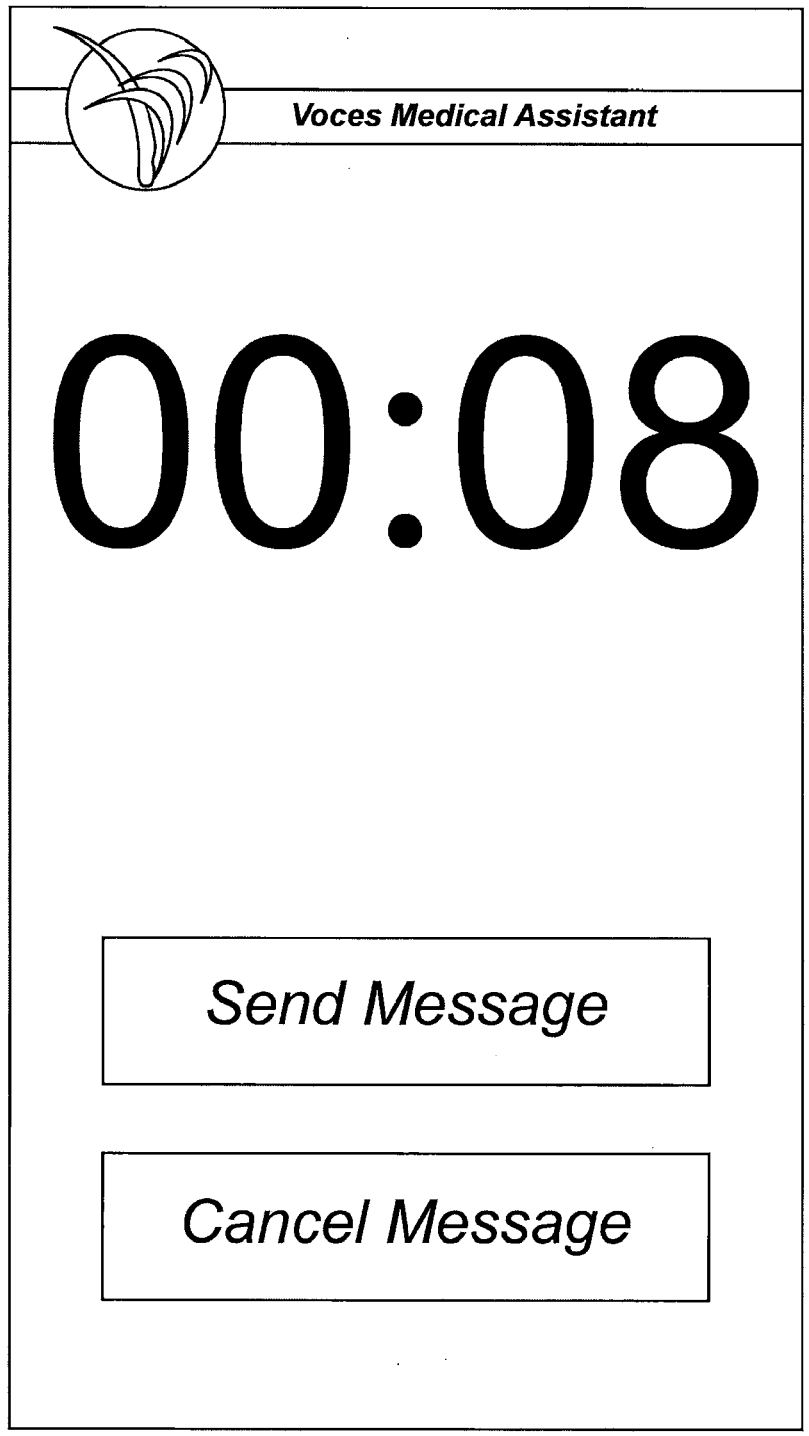
FIG. 9 is an illustration of an alert prevention screen displayed after the emergency call has been completed.

Next, as seen in FIG. 9, once the person has completed their emergency call an optional alert cancellation software module 50 is activated and an alert prevention screen is displayed. At this time, alert cancellation software module 50 prevents the emergency alert software module 20 from sending any alert messages to the ICE contact(s) 80A, 80B, 80C, etc. for a pre-set period of time after the 911 call has been made. Specifically, the screen informs the user that the ICE contacts will be sent a message in "X seconds". Optionally, X may be around 15 seconds, but any suitable short time period may be used. In optional embodiments, this time period may itself also be pre-programmed into the phone (for example to give a longer period of time to an elderly person who has difficulty handling their cell phone). A countdown clock begins to run. If the user does nothing, the clock runs out and the emergency alert software module 20 then automatically sends alert messages to the emergency ICE contacts 80A, 80B, 80C, etc. This fail-safe strategy is especially important in situations when the person making the emergency call becomes incapacitated. Unless the user turns the notify feature off, the default is that messages will be sent to the ICE contacts. Conversely, this fail-safe strategy is especially beneficial in situations where the person is making the emergency call on behalf of others. (For example when arriving on the scene of an accident or witnessing a medical emergency). In such situations, the user first completes their emergency call but then has sufficient time to prevent their phone from telling their contacts 80A, 80B, 80C that they have made an emergency call.

Assuming the alert cancellation software module 50 has not been activated (to prevent ICE contact notification), then emergency alert software module 40 will send an alert message to each of pre-programmed in emergency contacts 80A, 80B, 80C, etc. In preferred aspects, this alert message may simply comprise sending a text message from cell phone 10 to each emergency contact 80A, 80B, 80C, etc. Alternatively, or in addition, the present invention may also include sending an email or even a prerecorded message to ICE contacts 80A, 80B, 80C, etc.

The device user may have preprogrammed as little as once ICE contact 80, or multiple ICE contacts 80A, 80B, 80C, etc. The system will either simultaneously or sequentially send messages to each of the different ICE contacts. Moreover, the present system may optionally even be configured with different ICE contacts for different situations. For example, if calling emergency service 100 by dialing 911, then a number of the person's family members can be alerted. However, if only calling their doctor 102, then only one ICE contact (such as their caregiver 80A) needs to be notified.

Preferably as well, cell phone 10 has an internal GPS 15. As a result, the current location of cell phone 10 can also be sent by emergency alert software module 40 to either or both of the emergency service 100 and ICE contacts 80A, 80B, 80C, etc. This approach provides exceptional benefits. For example, as soon as the user dials 911 or other emergency number, the GPS will automatically be turned on (if it isn't on already). Then, the position of the cell phone will be determined. This location can then be automatically sent directly to the emergency service 100 (for example as a text message). As such, time is not wasted by the emergency operator trying to determine the location of the person making the 911 call. In addition, the location of cell phone 10 will also be sent to the ICE contacts after the emergency call has been completed. This enables family members to know the exact location of a loved one making an emergency call. In addition, the present system may be configured to provide continuous updates of the location, enabling family members to determine where the person has been transported by emergency personnel.

Additionally as well, the medical information pre-programmed into emergency alert software module 20 (FIGS. 6 and 7), can be automatically sent directly by emergency alert software module 40 to emergency service 100 (for example as a text message). As such, time is not wasted by the emergency operator trying to determine the medical background or history of the person making the 911 call. Should the 911 operator dispatch an ambulance or paramedic, the medical information can also be forwarded to them.

Figure 10:
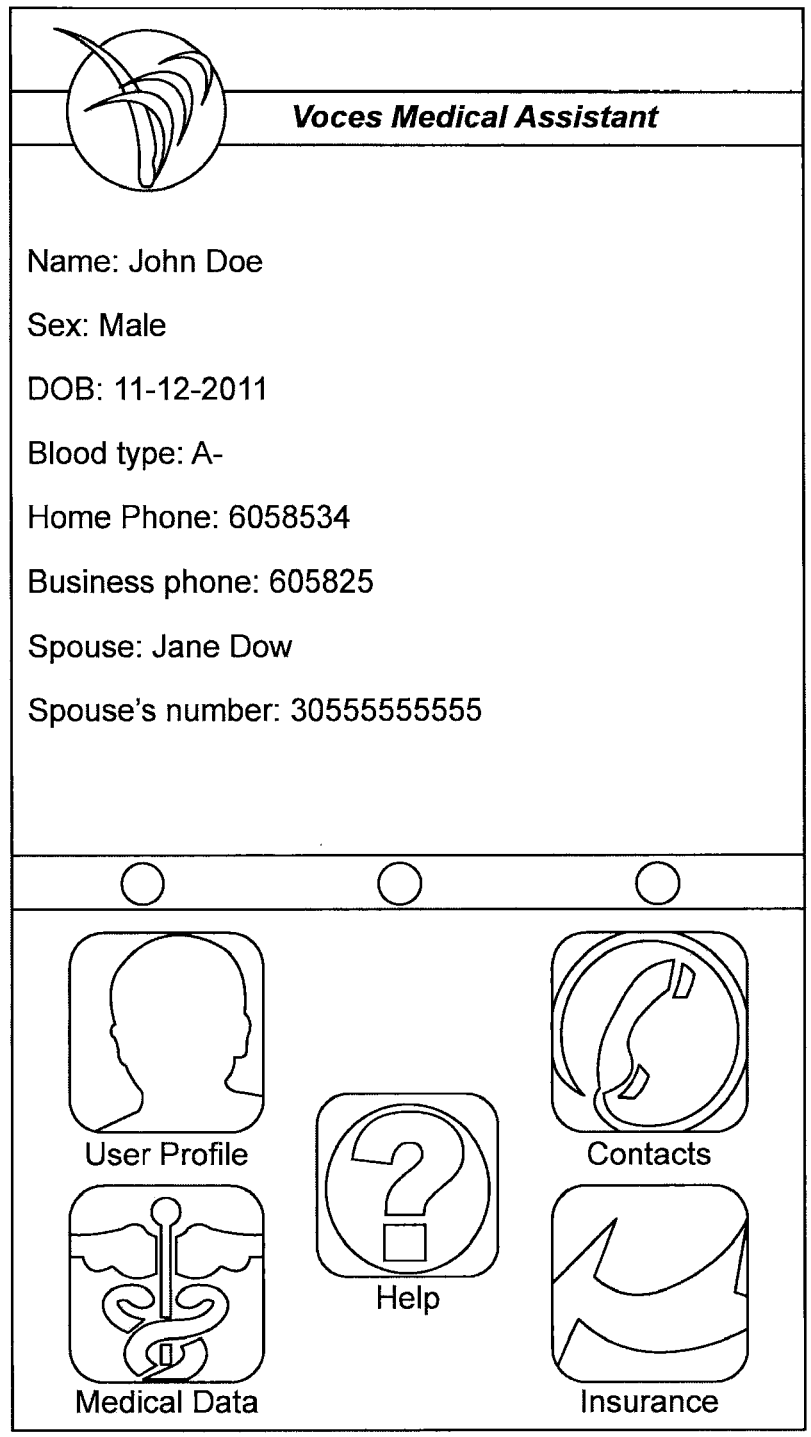
FIG. 10 is an illustration of the cell phone display after an emergency call has been completed and after the present system has alerted the cell phone user's emergency contacts.

Finally, as seen in FIG. 10, once the 911 call has been completed, and the ICE contacts 80A, 80B and 80C have been notified (both that an emergency call has been made and the location of the caller), then an optional emergency display software module 60 installed on mobile communication device 10 will display the user's ICE emergency contact information right on the cell phone screen. (e.g.: spouse "Jane Doe"). In addition, medical information pre-programmed into the cell phone can also be displayed. Moreover, a sound can also be automatically emitted from the phone at this time. The benefit of the screen shown in FIG. 10 (and any sound emitted) will be that paramedics, police, ambulance attendants, and even passers-by will quickly determine the identities of the ICE contacts and the medical history/conditions, insurance coverage, etc. of the person who made the emergency 911 call. This is particularly useful when the person is incapacitated or otherwise unable to respond after making the call.

Figure 11:
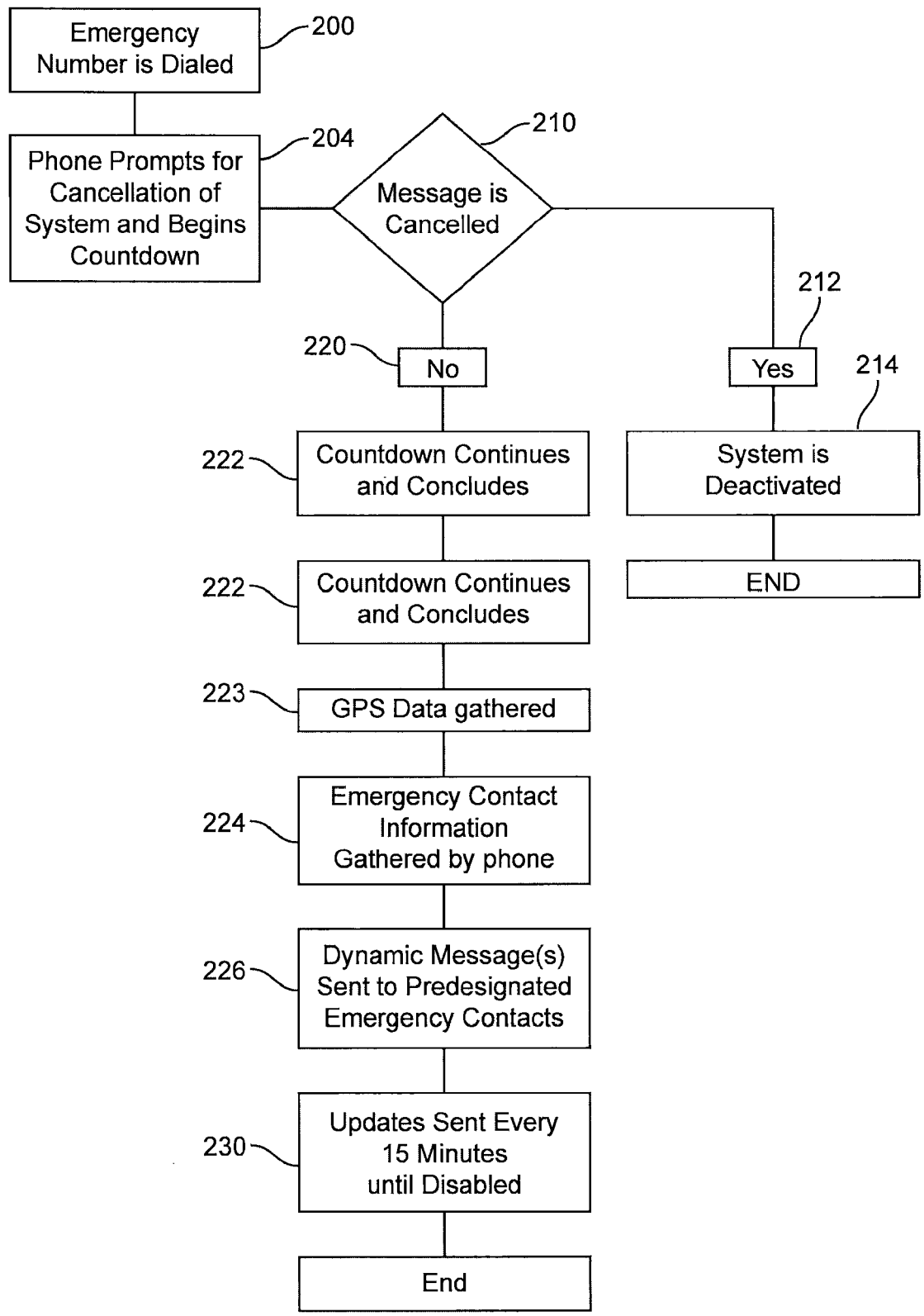
FIG. 11 is a flow chart of the preferred method of operation.

Lastly, FIG. 11 illustrates a flow chart of the preferred method of the present invention. In one preferred aspect, the present method of automatically alerting a person's emergency contact when the person makes an emergency call, comprises: inputting emergency contact information into an emergency contact software module installed on a mobile communication device; calling an emergency number from the mobile communication device, thereby activating an emergency call sensing software module installed on the mobile communication device; and having the emergency call sensing software module activate an emergency alert software module installed on the mobile communication device, wherein the emergency alert software module retrieves the emergency contact information and then sends a message to the emergency contact that the mobile communications device has called the emergency number.

Specifically, at step 200, cell phone 10 calls an emergency number such as 911. (It is to be understood that GPS 15 may be activated before, during or after the call, all keeping within the scope of the present invention). Next, at step 204 (as was illustrated in FIG. 9), the phone prompts the user as to whether or not they want to can cell the alert function. At 210, the decision is made. If, at step 212, the user decides to deactivate the system the system proceeds to step 214. Alternatively, if the user does not decide to deactivate the system (step 220), then the countdown continues. At step 223, the GPS data is gathered. Finally, step 224 is reached where the emergency contact information is gathered. Next, at step 226, alert messages are sent to contacts 80A, 80B, 80C, etc. by emergency alert software module 40. Optionally, the cell phone then displays the emergency contact information and/or medical information (as was seen in FIG. 10). Optionally as well, at step 230, updates of the cell phone's location can be sent every 15 minutes (or any other suitable interval of time)

to either or both of the emergency service 100 and the emergency contacts 80A, 80B, 80C, etc.

In preferred aspects, the user simply calls 911. It is to be understood that the present invention encompasses contacting any local emergency responder directly. In fact, the selection of which emergency number/service is called may optionally depend upon the GPS coordinates of the phone. As such, the cell phone could call the nearest local police or fire station depending upon its location. (This is another benefit of the present system of automatically transmitting the phone location to an emergency responder when an emergency call is made.

In optional aspects, a call to a first emergency number (e.g.: 911) may activate a second emergency service pre-set as an ICE contact. For example, a park ranger's cell phone could be pre-programmed with the ranger's station as one of the ICE contacts. Thus, should a ranger make a 911 call, cell phone 10 could automatically notify both the 911 responder and the ranger station as to the ranger's whereabouts.

What is claimed is:

1. A system for automatically alerting a person's contact when the person has made a call to a pre-determined number, comprising:
    a mobile communication device;
    a contact software module installed on the mobile communication device for a person to pre-identify at least one contact and input contact information;
    a call number sensing software module installed on the mobile communication device for sensing when the mobile communications device has called a pre-determined number;
    an alert software module installed on the mobile communication device for alerting at least one contact that the mobile communications device has called the pre-determined number, and
    an alert cancellation software module installed on the mobile communication device for preventing the alert software module from alerting one or more contacts when:
        (i) the alert cancellation software module has been activated within a pre-determined period of time after the call to the pre-determined number has been made,
        (ii) a connection to the pre-determined number has been established, and
        (iii) the call to the pre-determined number has been completed and the call to the pre-determined number has ended, and wherein
    the person's contact is alerted using the same communication network through which the pre-determined number was called, and
    the person's contact is automatically called after the call to the pre-determined number has concluded, unless the alert cancellation software module has cancelled the alert to the person's contact.

2. The system of claim 1, wherein the person's contact is an emergency contact, and wherein the pre-determined number is an emergency number.

3. The system of claim 1, wherein alerting one or more contacts comprises sending a text, SMS or other digital message from the mobile communication device to the at least one contact.

4. The system of claim 3, wherein alerting one or more contacts comprises alerting a plurality of different contacts.

5. The method of claim 4, wherein the plurality of different contacts are simultaneously alerted.

6. The system of claim 1, wherein the mobile communications device includes a GPS, and wherein the alert software module sends the location of the mobile communications device to one or more contacts when the mobile communications device has called the pre-determined number.

7. The system of claim 2, wherein the mobile communications device includes a GPS, and wherein the alert software module sends the location of the mobile communications device to an emergency service associated with the emergency number when the mobile communications device has called the emergency number.

8. The system of claim 1, wherein the contact software module is configured for the person to input personal emergency information.

9. The system of claim 8, wherein the personal emergency information comprises medical information.

10. The system of claim 8, wherein the alert software module sends the personal emergency information to an emergency service associated with the emergency number when the mobile communication device has called the emergency number.

11. The system of claim 1, further comprising:
    an emergency display software module installed on the mobile communication device for displaying the contact information on a screen of the mobile communication device after the mobile communication device has alerted the at least one contact.

12. The system of claim 11, wherein the emergency display software module also displays personal emergency information that has been pre-inputted into the emergency contact software module.

13. The system of claim 1, wherein the mobile communication device is a cell phone.

14. The system of claim 1, wherein the emergency contact information inputted into the emergency contact software module comprises the identities of ICE contacts.

15. A method of automatically alerting a person's contact or contacts when the person makes a call to a pre-determined number, comprising:
    inputting contact information into a contact software module installed on a mobile communication device;
    calling a pre-determined number from the mobile communication device, thereby activating an call number sensing software module installed on the mobile communication device;
    having the call number sensing software module activate an emergency alert software module installed on the mobile communication device, wherein the emergency alert software module retrieves the emergency contact information and then sends a message to the emergency contact that the mobile communications device has called the pre-determined number, a connection to the pre-determined number has been established, the call to the pre-determined number has been completed and the call to the pre-determined number has ended; and
    activating an alert cancellation software module installed on the mobile communication device, thereby preventing the emergency alert software module from alerting the emergency contact, and wherein
    the person's contact or contacts are alerted using the same communication network through which the pre-determined number was called, and
    the person's contact or contacts are automatically alerted after the call to the pre-determined number has concluded, unless the alert cancellation software module has cancelled the alert to the person's contact or contacts.

16. The method of claim 15, wherein the person's contact is an emergency contact, and wherein the pre-determined number is an emergency number.

17. The method of claim 16, further comprising:
having the emergency alert software module send a message to a plurality of different pre-stored emergency contacts.

18. The method of claim 16, further comprising:
determining the location of the mobile communication device with a GPS; and
sending the location of the mobile communication device to at least one of:
(a) the emergency contact, and
(b) an emergency service associated with the emergency number.

19. The method of claim 16, further comprising:
inputting personal emergency information into the emergency contact software module; and
sending the personal emergency information to device to at least one of:
(a) the emergency contact, and
(b) an emergency service associated with the emergency number.

20. The method of claim 19, wherein the alert cancellation software module must be activated within a pre-determined period of time after the emergency call has been made to prevent the emergency alert software module from alerting the emergency contact.

21. The method of claim 16, further comprising:
displaying the emergency contact information on a screen of the mobile communication device after the mobile communication device has alerted the at least one emergency contact.

22. The system of claim 1, wherein the mobile communication device is any device that is aware of its own location.

23. The system of claim 1, wherein the mobile communication device is a tablet, laptop or desktop computer.

24. The method of claim 15, wherein the mobile communication device is any device that is aware of its own location.

25. The method of claim 15, wherein the mobile communication device is a tablet, laptop or desktop computer.

* * * * *